July 12, 1932. I. STERN 1,867,286
MACHINE FOR MAKING LINERS FOR BASKETS AND THE LIKE
Filed Feb. 18, 1928 10 Sheets-Sheet 2
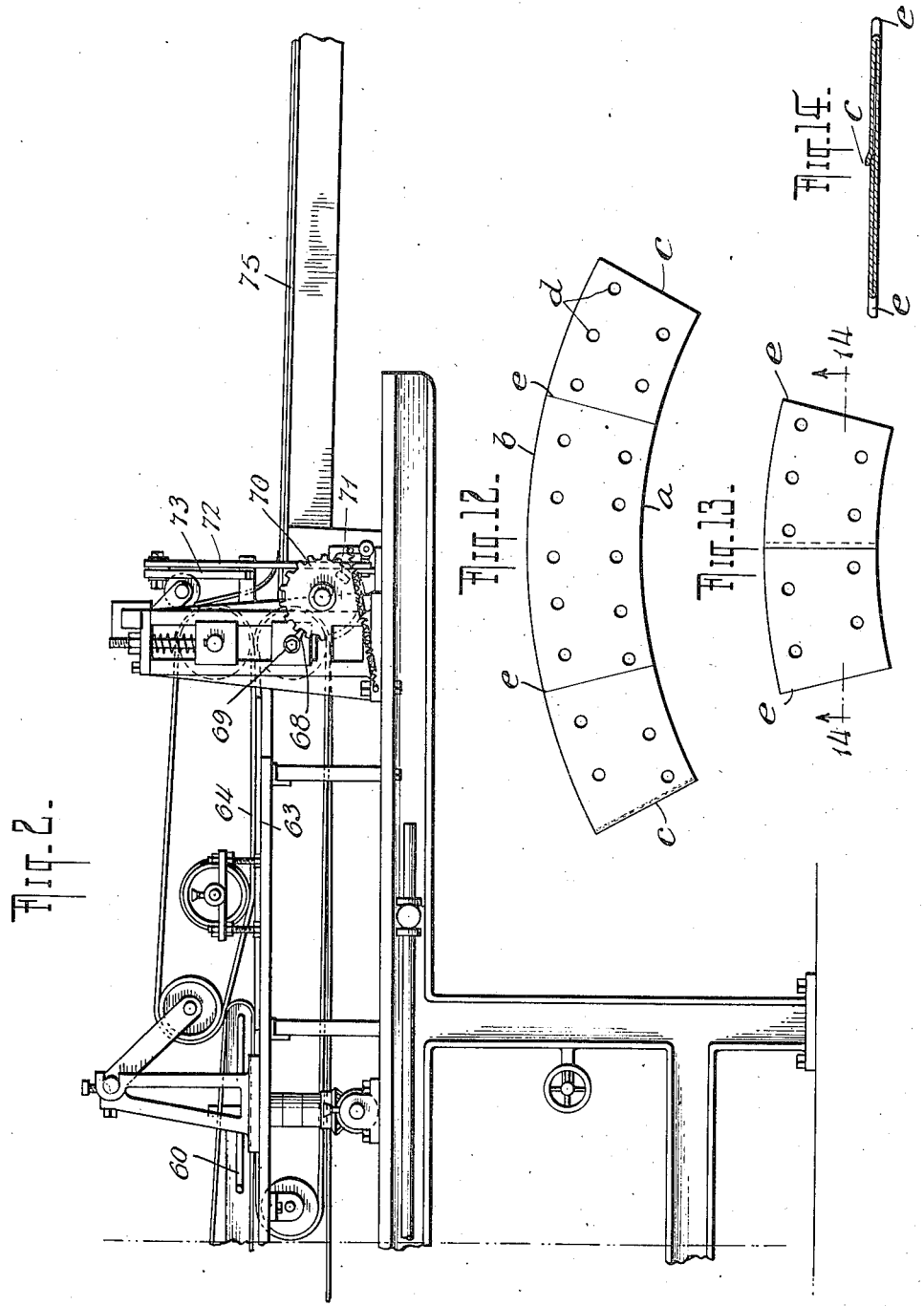
INVENTOR
ISAAC STERN
BY
ATTORNEYS

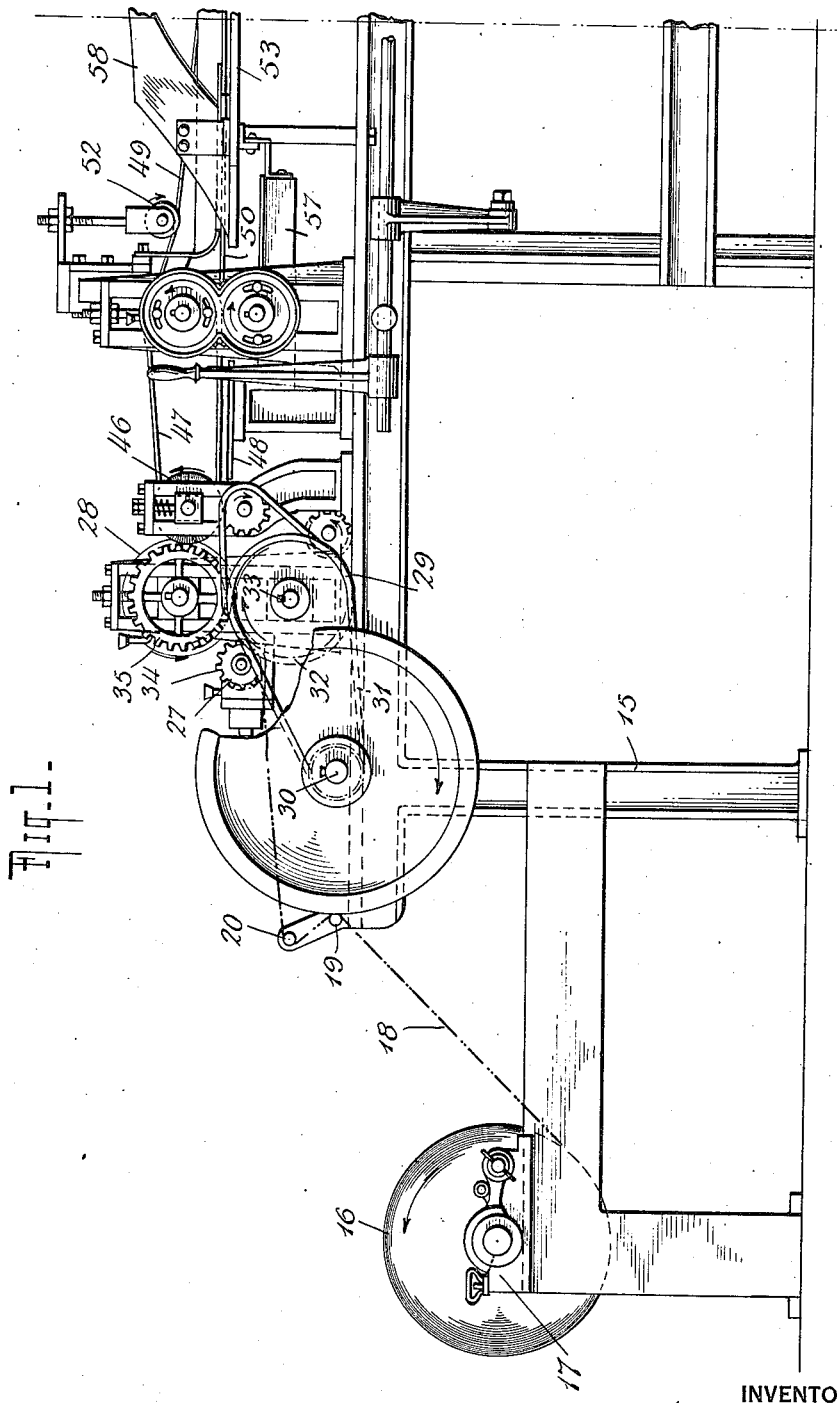

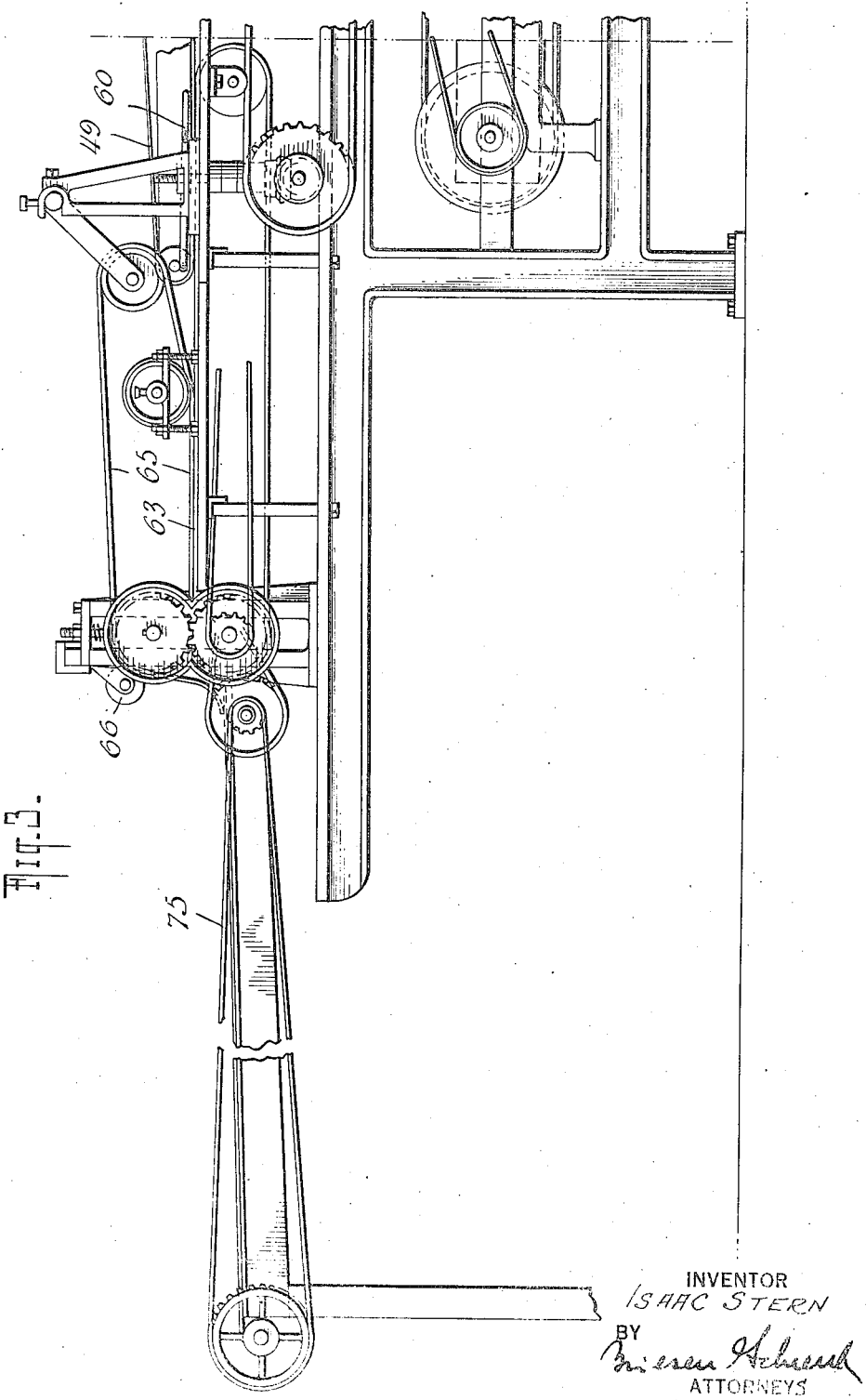

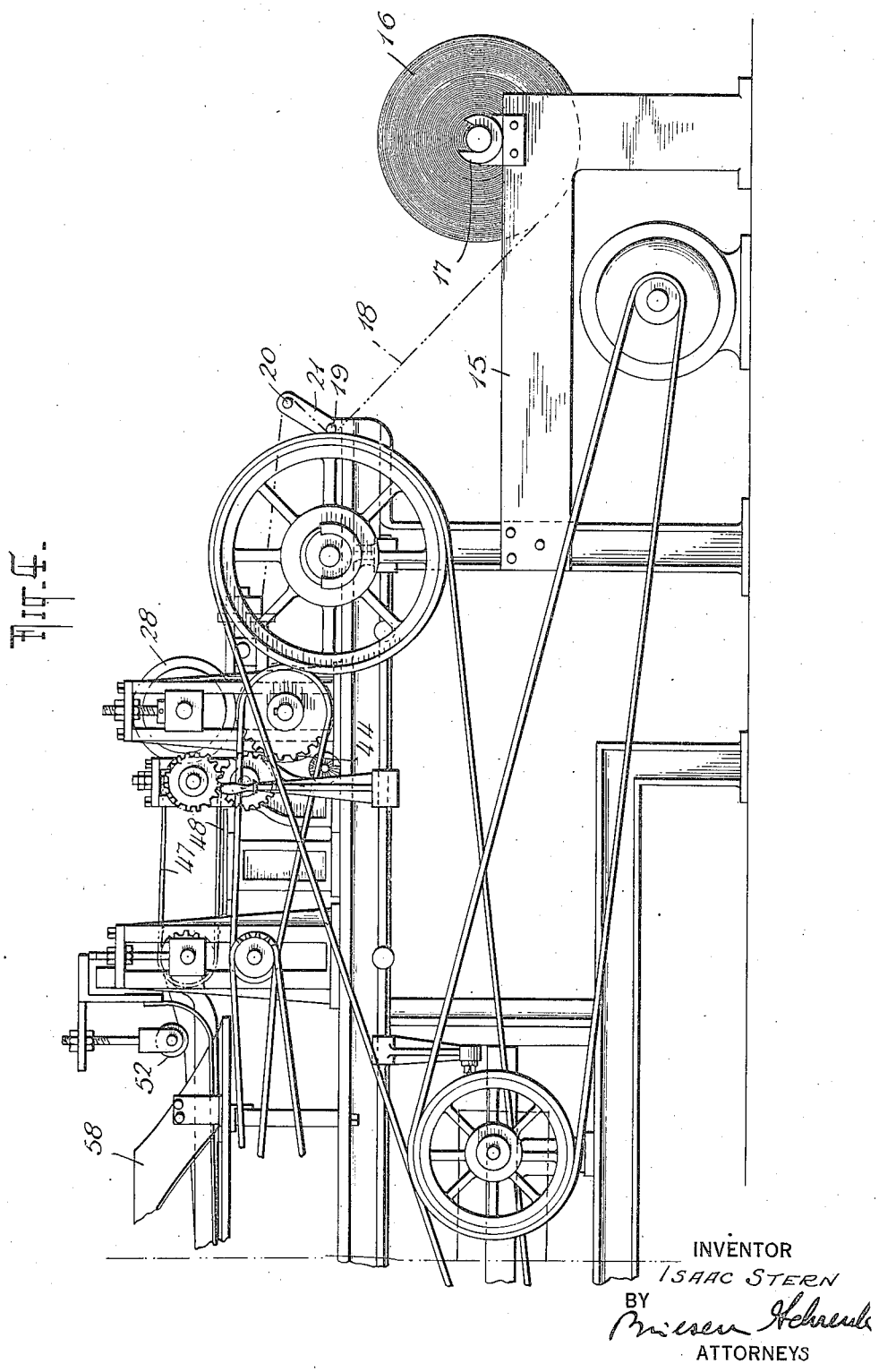

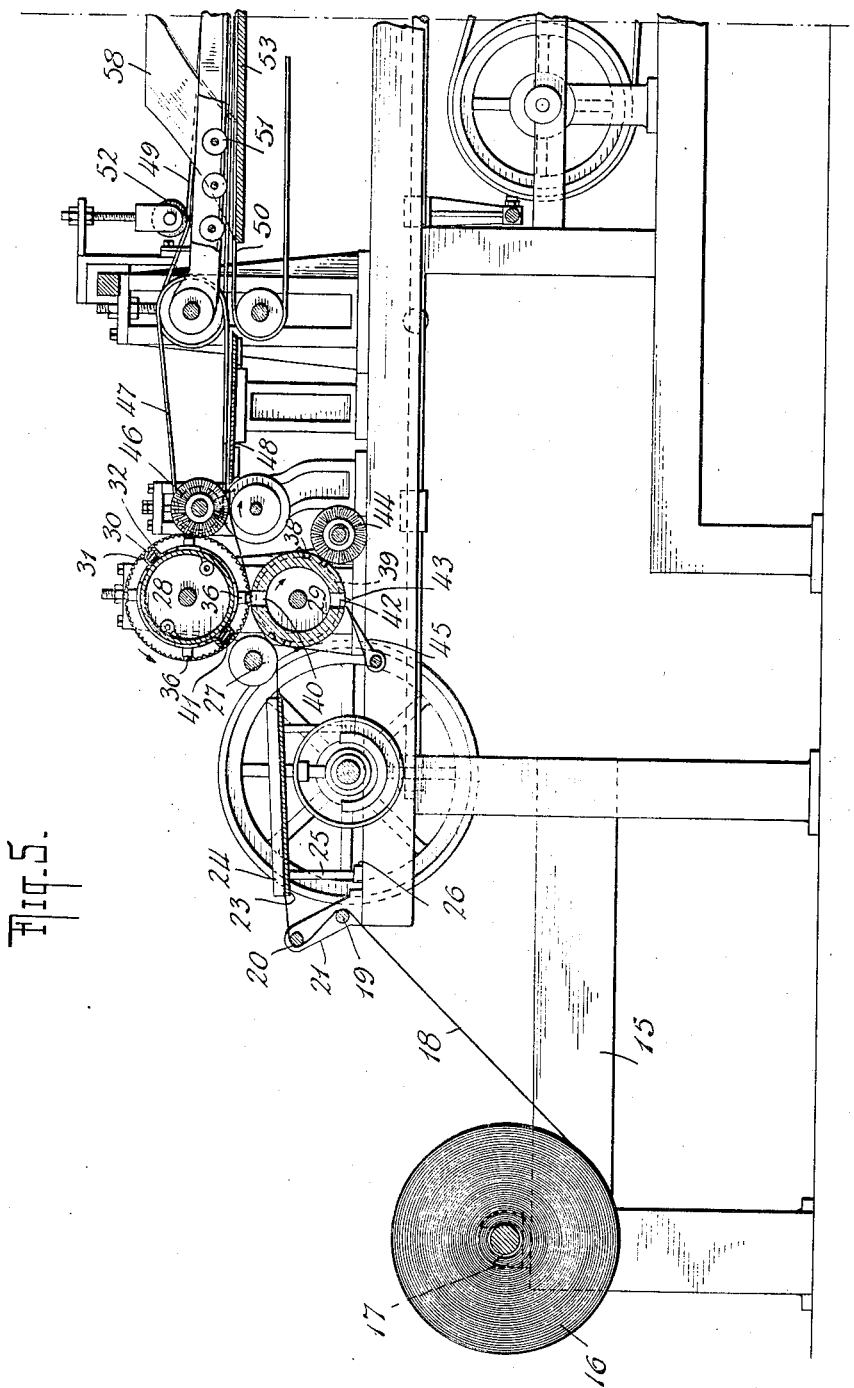

July 12, 1932.  I. STERN  1,867,286
MACHINE FOR MAKING LINERS FOR BASKETS AND THE LIKE
Filed Feb. 18, 1928   10 Sheets-Sheet 6
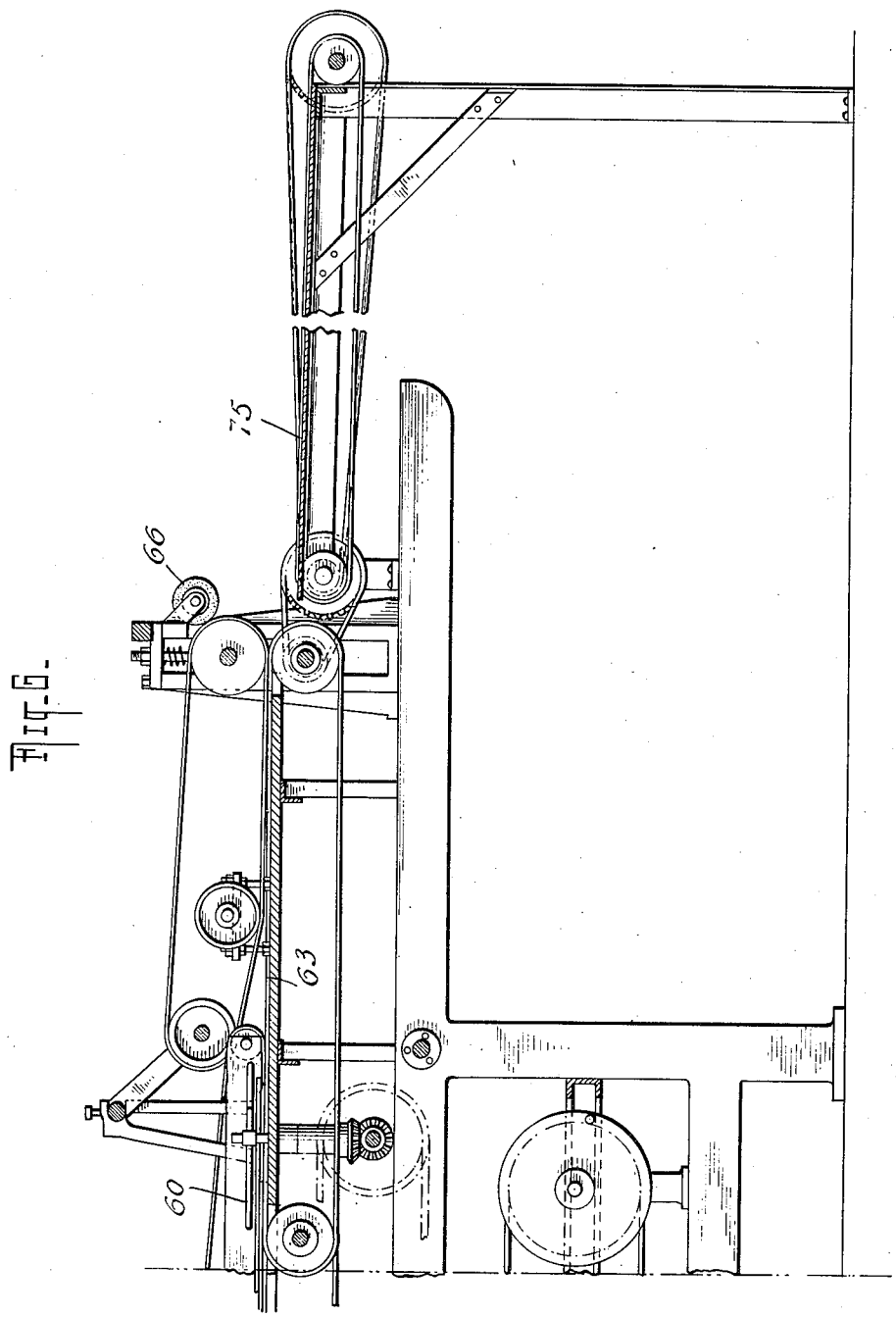
INVENTOR
ISAAC STERN
BY
ATTORNEYS

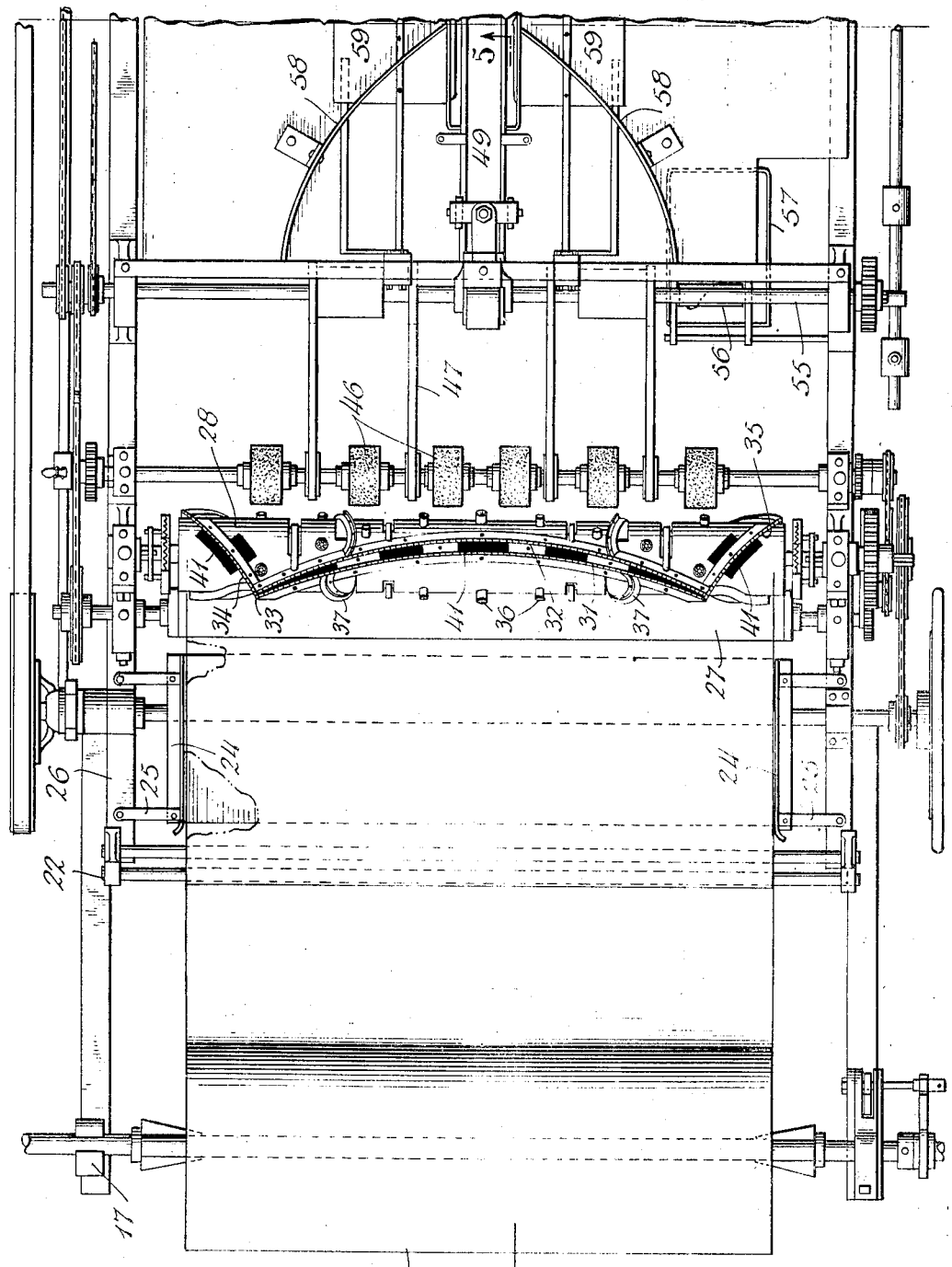

July 12, 1932.  I. STERN  1,867,286
MACHINE FOR MAKING LINERS FOR BASKETS AND THE LIKE
Filed Feb. 18, 1928    10 Sheets-Sheet 8
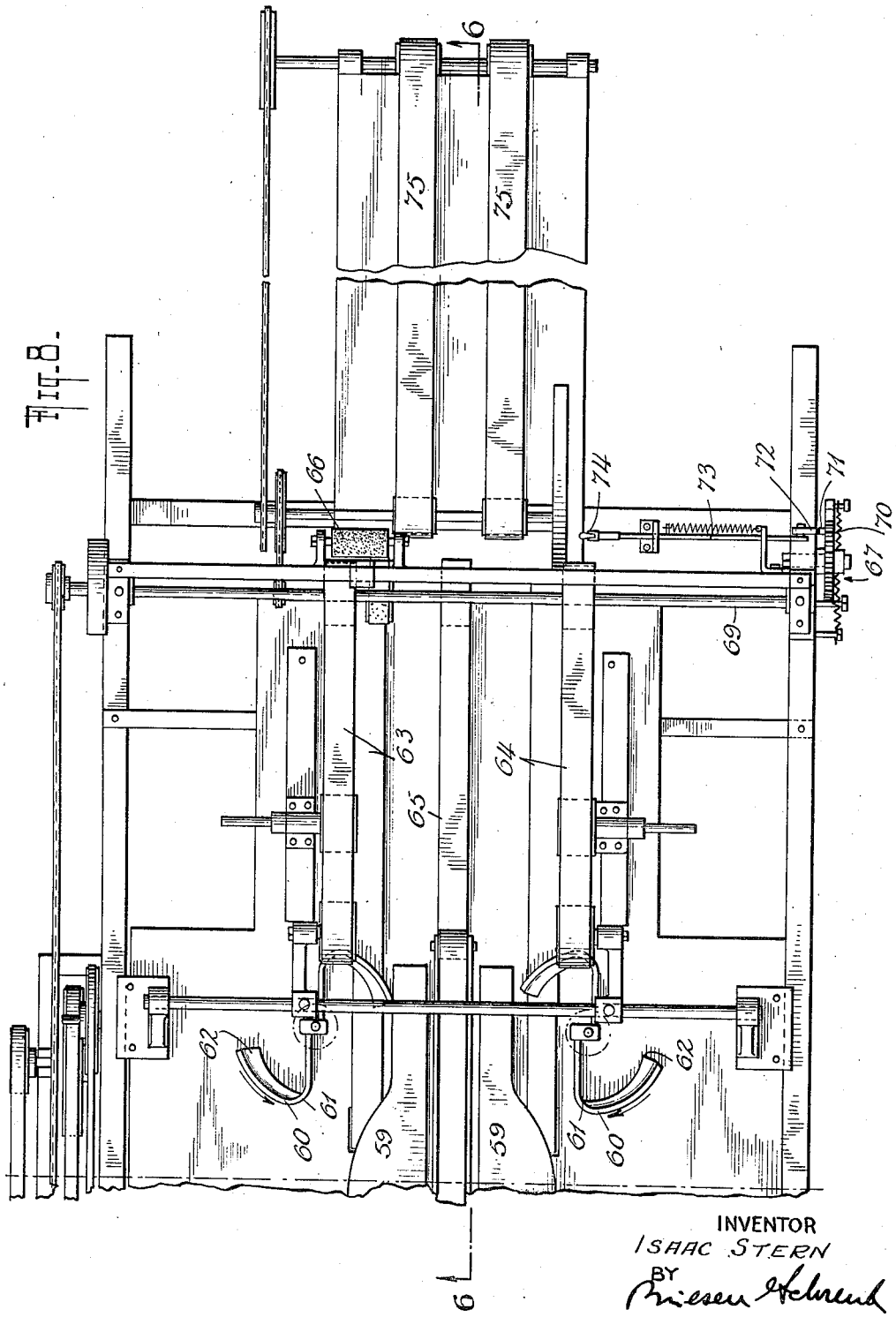
INVENTOR
ISAAC STERN
BY
ATTORNEYS July 12, 1932.  I. STERN  1,867,286
MACHINE FOR MAKING LINERS FOR BASKETS AND THE LIKE
Filed Feb. 18, 1928  10 Sheets-Sheet 9
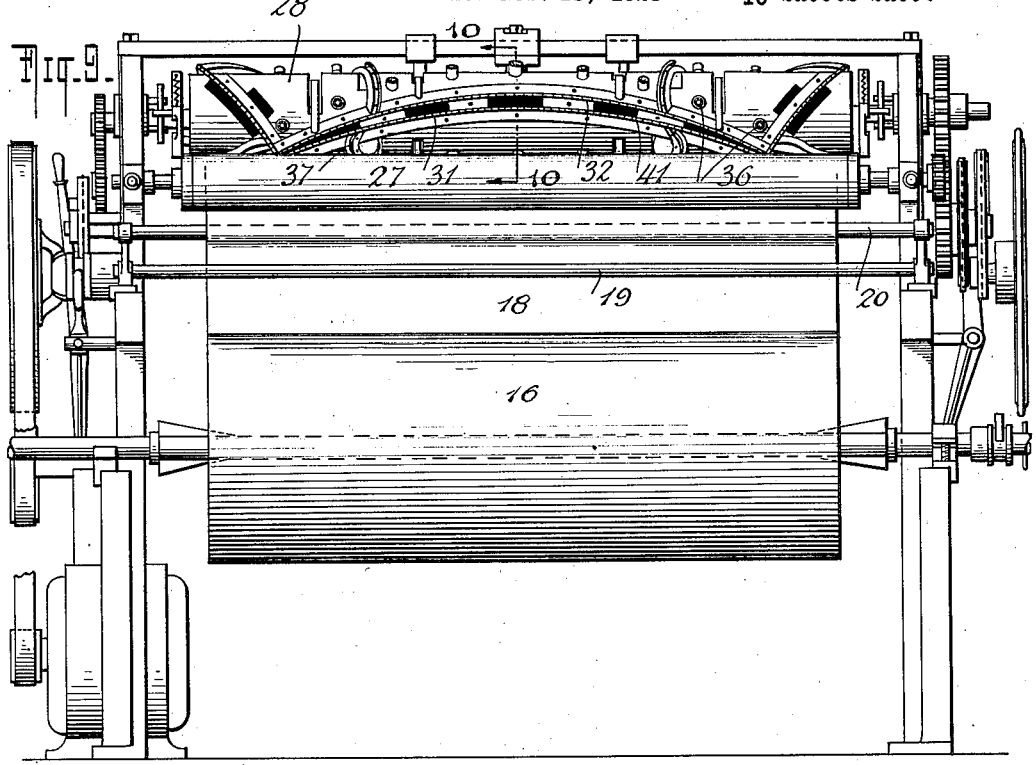
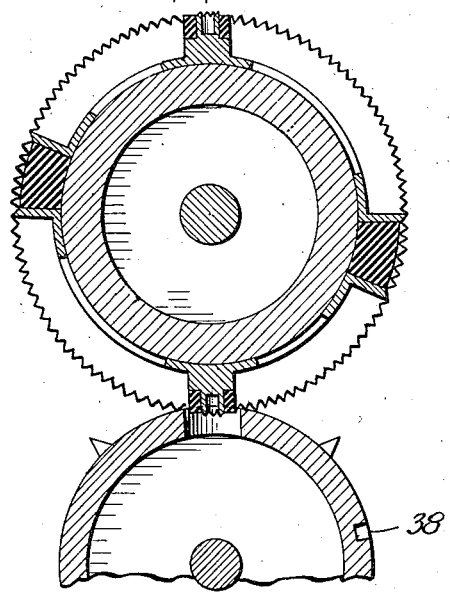
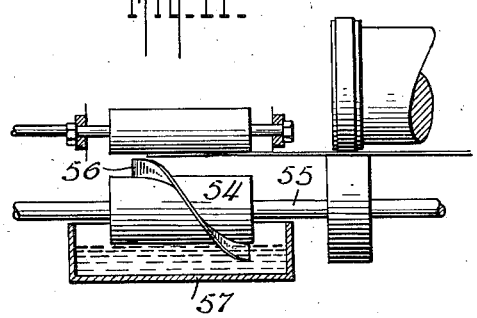
INVENTOR
ISAAC STERN
BY
ATTORNEYS

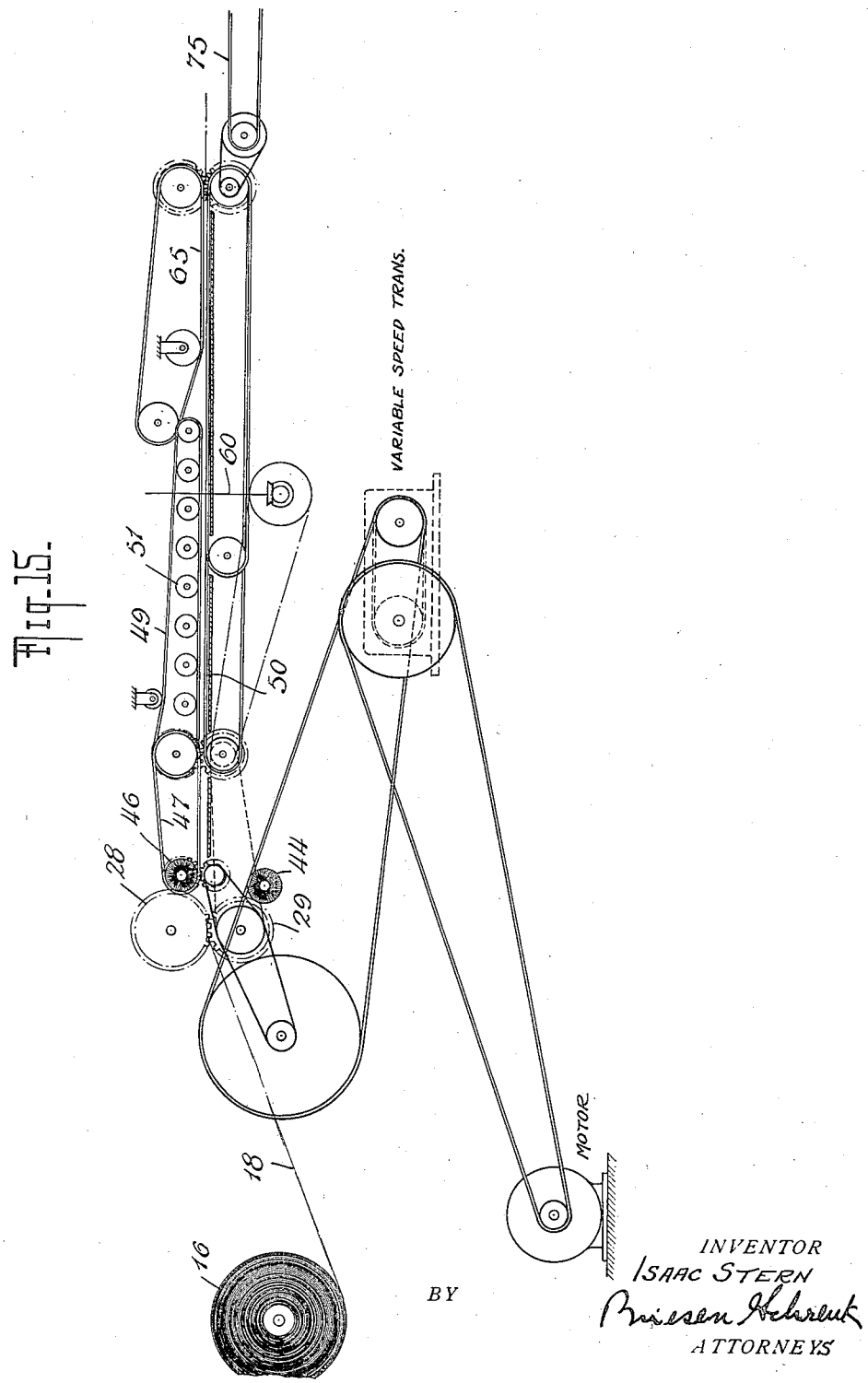

Patented July 12, 1932

1,867,286

UNITED STATES PATENT OFFICE

ISAAC STERN, OF BROOKLYN, NEW YORK, ASSIGNOR TO S & S CORRUGATED PAPER MACHINERY CO., INC., OF BROOKLYN, NEW YORK, A CORPORATION OF NEW YORK

MACHINE FOR MAKING LINERS FOR BASKETS AND THE LIKE

Application filed February 18, 1928. Serial No. 255,318.

The machine of this invention is intended to make complete liners for fruit baskets and the like, preferably from a roll of paper in continuous operations and high speed.

In the drawings, Figs. 1 and 2 are elevations of the machine at the right side thereof looking in the direction of the feed of the paper. Figs. 3 and 4 are side elevations of the opposite side of the machine. Figs. 5 and 6 complete sections on lines 5—5 and 6—6 of Figs. 7 and 8 respectively. Figs. 7 and 8 are plan views of Figs. 1 and 2 respectively; Fig. 9 is an end elevation at the paper feed end; Fig. 10 is an enlarged section on line 10—10 of Fig. 9; Fig. 11 detail of gumming device; Fig. 12 a top view of the liner after perforation and scoring but before the edges are secured together. Fig. 13 top view of the finished blank; Fig. 14 section on line 14—14 of Fig. 13 and Fig 15 is a diagrammatic view of the course of the paper blanks through the machine.

The frame 15 supports a roll of paper 16 which is mounted in the bracket 17. The web of paper is fed through the machine for the purpose of cutting therefrom a liner, for a bushel basket, which in an unfolded and pasted condition is shown in Fig. 12 and in the pasted condition in Figs. 13 and 14. The web of paper 18 passes under the guide roll 19 and then over the guide roll 20, supported in the brackets 21 and 22, then onto the table 23 which is provided with the marginal guides 24 supported by the arms 25 which are carried by the side frames 26. The paper web 18 then passes under the guide roll 27 and between the blank cutting and perforating cylinders 28 and 29 The said cylinders 28 and 29 cooperate to cut the blank, to the configuration shown in Fig. 12, and simultaneously form the perforations, likewise shown in said figure. The blank cutting cylinder 28 is equipped with two sets of cutting knives 30 oppositely disposed on the cylinder 28 as appears from Fig. 5 which knives extend substantially across the entire length of the cylinder 28. Each set of cutting knives comprises the arc-shaped knife 31 and the arc-shaped knife 32, which, as appears from Fig. 7, have different degrees of curvature but approach one another closely at the points 33 where they join the marginal cutting knives 34 and 35. The knife 31 cuts the edge $a$ of the blank (as illustrated in Fig. 12) while the cutting knife 32 cuts the edge $b$ of the next succeeding blank. The marginal knives 34 and 35 cut the side edges of the blank represented at $c$ in Fig. 12. The distance from one of the knives 32 of one set to the knife 31 of the other set corresponds to the width of the blank from lines $a$ to $b$. A single liner is, therefore, completely severed from the web, after it has been cut by a knife 32 of one set and by the knife 31 of the other set and by marginal knives 34 and 35. The punching dies 36 are arranged over the surface of the cylinder 28 for the purpose of forming the ventilating holes $d$ in the surface of the blank. The S-shaped creasers 37 are also carried by the cylinder 28 and as the blank passes thereunder the crease lines $e$ (shown in Fig. 12) are formed therein. The lower co-operating roller 29 is provided with suitable depressions 38 with which the edges of the knives 31 and 32 cooperate in severing the blanks. Corresponding depressions 39 are formed in the roller 29 beneath the marginal knives 34 and 35 to effect proper cutting action of the marginal edges of the blank. The recesses 40 are also formed in the cylinder 29 for co-operation with the punching dies 36. The cutting knives, 31, 32, 34 and 35 are provided at their margins with sponge rubber pads 41 which bear upon the web of paper 18 as it passes through the machine in order to assist in the feeding thereof and to hold the paper in contact with the lower cylinder 29. The waste paper from between the knives 31 and 32 and the punchings from the dies 36 drop into the cylinder 29 and fall out of said cylinder through slots 42. The cylinder 29 is provided with teeth 43 which punch through the web of paper and assist in the feeding thereof. The teeth 43 also carry the waste paper cut from the web, by the marginal knives 34 and 35 and, with the cooperation of the brush 44 carry such waste to the fingers 45 which strip such waste from the teeth 43 and permit it to drop underneath the machine. The blank, after it has been cut to shape and punched, is fed by the brushes 46 under the feed belt 47, which feed belt 47 carries the blank over the surface of the table 48 between the feed belts 49 and 50, the latter being supported by the table 53. The said feed belt 49 is weighted by the rollers 51 in order to depress the same and keep it in engagement with the blank. Tension is also applied to the belt 49 by means of the adjustable pressure roller 52. The blank, just as it enters between the feed rollers 49 and 50, has paste applied to one edge immediately inside thereof by the paste applying vein, which paste applying vein is secured to the pasting roller 54 on the rotating shaft 55, the vein 56 dipping into the paste pot 57. The blank is fed along feed belts 49 and 50 with the extreme edges thereof riding upwardly on the upwardly and inwardly inclined folding wings 58 which, by reason of their gradual inclination, bend the blank ends toward each other, along the lines e—e (of Fig. 12), the central portion of the blank being, in the meantime, firmly retained and fed by the belts 49 and 50. The blanks, after they pass from under the folding wings 58, are fed with the central portion under control of the belts 49 and 50 and with the turned-in ends resting on the plates 59 under revolving folding arms 60, which folding arms force the opposite ends of the blank downwardly so that the end of the liner to which the paste is applied, lies underneath the opposite blank end. The folding arms 60 have the under surfaces thereof inclined from the nose 61 downwardly to the end 62 thereof, resulting in the blank being first depressed by the nose 61 of the folding arms and gradually forced downwardly so that the ends are caused to adhere. The blank is then picked up by the feed belts 63 and 64 along the crease line e upon which they act to flatten the same. The central portion of the blank is supported on the belt 65 and conveyed to the printing mechanism 66 where they may be inscribed with the name of the manufacturer or other suitable data. The liners, as they pass from beneath the feed belt 62, are counted by the appliance 67 which consists of the dog 68, driven in timed relation with the other mechanism of the machine, by the shaft 69. The dog 68, by reason of its engagement with the teeth on the gear 70, advances said gear a predetermined space upon the completion of each revolution of the dog 68 and the shaft 69. The gear 70 is provided with a lug 71, which lug pushes against the rocking arm 72 causing rocking movement of the pusher arm 73. The end of the pusher arm 73 is provided with a depressed face 73 which, upon actuation of the pusher arm 73, engages the side edge of the particular blank then in its path, pushing it out of alignment with the other blanks thereby indicating that a definite number of blanks have preceded the blank which is pushed out of alignment. It is preferred to so proportion the counting appliance that each fiftieth blank is thus moved out of alignment. The blanks then pass onto the conveying belts 75 whereby they are conveyed to the end of the machine where they are removed by hand in the counted units of fifty.

I claim:

1. In a machine for forming liners from a web of paper, in combination, a cylinder, a pair of spaced arcuate knives on the cylinder, one of said knives being adapted to cut the edge of one blank and the other knife being adapted to cut the succeeding edge of the next blank, said knives by their cutting action severing from between two succeeding blanks a section of paper corresponding to the shape of the space between said knives, a second pair of arc-shaped knives, spaced from and corresponding to said first mentioned pair, and adapted to form similar cuts in said web, a corresponding cylinder having a surface adapted to cooperate with said knives during their severing action, means to form transverse crease lines in said blank, paste applying means adapted to apply paste near one edge of one of the blank ends, folders to raise the opposite ends of the blank and permit them to fall towards the body of the blank and arms to press said blank ends together to cause them to adhere.

2. In a machine for forming liners from a web of paper, in combination, a pair of co-acting cylinders, means to guide a web of paper between said cylinders, one of said cylinders being provided with a pair of arcuate cutting knives, the extreme edges whereof are in close proximity, one of said cutting knives being adapted during rotation of the cylinder to form a curved cut in one edge of a liner and the other knife being adapted to form a curved cut in an edge of the next succeeding liner, a second pair of arc-shaped knives, spaced from and corresponding to said first mentioned pair, and adapted to form similar cuts in said web, paste applying means adapted to apply paste near one edge of one of the ends of the liner, stationary folders adapted to raise the opposite ends of the liner and force them toward one another and creasing arms adapted to press the folded liner ends together.

3. In a machine for forming liners from a web of paper, in combination, a pair of co-acting cylinders, means to guide a web of paper between said cylinders, one of said cylinders being provided with a pair of spaced arc-shaped cutting knives, said arc-shaped knives being spaced furthest apart near the central transverse line thereof and converging at both sides of said transverse line, marginal knives bordering said arc-shaped knives, said arc-shaped knives being adapted during rotation of the cylinder to cut one edge of a liner and the other knife being adapted to cut an edge of the next succeeding liner, said marginal knives being adapted to cut the side edges of the liner, a second pair of arc-shaped knives, spaced from and corresponding to said first mentioned pair, and adapted to form similar cuts in said web, paste applying means adapted to apply paste near one edge of one of the ends of the liner, stationary folders adapted to raise the opposite ends of the liner and force them toward one another and creasing arms adapted to press the folded liner ends together.

4. In a machine for forming liners from a web of paper, in combination, a pair of co-acting cylinders, means to guide a web of paper between said cylinders, one of said cylinders being provided with a pair of arcuate cutting knives, the extreme edges whereof are in close proximity, one of said cutting knives being adapted during rotation of the cylinder to cut one edge of the blank and the other knife being adapted to cut an edge of the next succeeding liner, a second pair of arc-shaped knives, spaced from and corresponding to said first mentioned pair, and adapted to form similar cuts in said web, paste applying means adapted to apply paste near one edge of one of the ends of the liner, inclined stationary folders, a feed belt positioned between said folders, said feed belt being adapted to support the liner between the ends thereof, said folders being adapted to raise the opposite ends of the liner and force them toward one another and creasing arms adapted to press the folded liner ends together.

5. In a machine for forming liners from a web of paper, in combination, a pair of co-acting cylinders, means to guide a web of paper between said cylinders, one of said cylinders being provided with a pair of arcuate cutting knives and creasing elements positioned on said cylinder inside of the edges thereof, one of said cutting knives being adapted during rotation of the cylinder to cut one edge of the liner and the other knife being adapted to cut an edge of the next succeeding liner, a second pair of arc-shaped knives, spaced from and corresponding to said first mentioned pair, and adapted to form similar cuts in said web, paste applying means adapted to apply paste near one edge of one of the ends of the liner, inclined stationary folders, a feed belt positioned between said folders, said feed belt being adapted to support the liner between the creases formed by said creasing element, said folders being adapted to raise the opposite ends of the liner and cause said liner to fold along said creased lines and force them toward one another and creasing arms adapted to press the folded liner ends together.

6. In a machine for forming liners from a web of paper, in combination, a pair of co-operating cylinders, one of said cylinders being provided with spaced arc-shaped knives, the extreme edges whereof are in close proximity, said knives being adapted to cut an edge of one liner and an edge of a succeeding liner, marginal knives positioned near the ends of said cylinder adapted to cut the side edges of the liner, a second pair of arc-shaped knives, spaced from and corresponding to said first mentioned pair, and adapted to form similar cuts in said web, creasers positioned inside of the edges of said cylinder adapted to form corresponding creases in said liner, a multiplicity of punches carried by said cylinder adapted to perforate said liner, paste appying means adapted to apply paste near one edge of one of the ends of the liner, stationary folders adapted to raise the opposite ends of the liner and force them toward one another and creasing arms adapted to press the folded liner ends together.

In testimony whereof I have hereunto set my hand.

ISAAC STERN.